US012639445B2

(12) United States Patent
Bosch et al.

(10) Patent No.: US 12,639,445 B2
(45) Date of Patent: May 26, 2026

(54) PENETRATION TESTING FOR API SERVICE SECURITY

(71) Applicant: Cisco Technology, Inc., San Jose, CA (US)

(72) Inventors: Hendrikus G.P. Bosch, Aalsmeer (NL); Alessandro Duminuco, Milan (IT); Sape Jurriën Mullender, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 17/662,477

(22) Filed: May 9, 2022

(65) Prior Publication Data

US 2023/0004651 A1     Jan. 5, 2023

Related U.S. Application Data

(60) Provisional application No. 63/217,055, filed on Jun. 30, 2021.

(51) Int. Cl.
*G06F 21/57* (2013.01)
*G06F 9/54* (2006.01)

(52) U.S. Cl.
CPC .............. *G06F 21/577* (2013.01); *G06F 9/54* (2013.01); *G06F 2221/033* (2013.01)

(58) Field of Classification Search
CPC ..... G06F 21/577; G06F 2221/033; G06F 9/54
See application file for complete search history.

(56) References Cited

U.S. PATENT DOCUMENTS

| | | | | |
|---|---|---|---|---|
| 8,584,094 | B2 * | 11/2013 | Dadhia | G06F 9/45558 |
| | | | | 718/1 |
| 10,437,712 | B1 * | 10/2019 | Tyler | G06F 11/3684 |
| 10,956,244 | B1 | 3/2021 | Cho | |
| 11,321,219 | B2 * | 5/2022 | Godefroid | G06F 11/3636 |
| 11,379,348 | B2 * | 7/2022 | Sathianarayanan | |
| | | | | G06F 11/3688 |
| 2019/0034210 | A1 * | 1/2019 | Palladino | G06F 9/544 |
| 2020/0226002 | A1 * | 7/2020 | MacLeod | G06F 8/71 |
| 2020/0233790 | A1 * | 7/2020 | Battaglia | H04L 67/02 |
| 2021/0133089 | A1 | 5/2021 | Khillar et al. | |
| 2021/0303454 | A1 * | 9/2021 | Wang | G06F 9/54 |

(Continued)

FOREIGN PATENT DOCUMENTS

TR     201807314 A2 * 12/2019

OTHER PUBLICATIONS

Sharma, Abhinav, and M. Revathi. "Automated API testing." 2018 3rd International Conference on Inventive Computation Technologies (ICICT). IEEE, 2018. (Year: 2018).*

(Continued)

*Primary Examiner* — Madhuri R Herzog
(74) *Attorney, Agent, or Firm* — Baker Botts L.L.P.

(57) ABSTRACT

According to some embodiments, a method comprises: obtaining an application programming interface (API) specification for an API service; performing one or more tests on the API service to determine an amount of deviation between the API service and the API specification; and determining a deviation score based on the amount of deviation between the API service and the API specification. The method may include transmitting the deviation score to a scoring agent.

20 Claims, 2 Drawing Sheets

200 ⟶

OBTAIN AN APPLICATION PROGRAMMING INTERFACE (API) SPECIFICATION FOR AN API SERVICE — 212

PERFORM ONE OR MORE TESTS ON THE API SERVICE TO DETERMINE AN AMOUNT OF DEVIATION BETWEEN THE API SERVICE AND THE API SPECIFICATION — 214

DETERMINE A DEVIATION SCORE BASED ON THE AMOUNT OF DEVIATION BETWEEN THE API SERVICE AND THE API SPECIFICATION — 216

TRANSMIT THE DEVIATION SCORE TO A SCORING AGENT — 218

RECEIVE AN INDICATION TO DISABLE PERFORMING ONE OR MORE TESTS ON THE API SERVICE — 220

(56)　　　　　References Cited

U.S. PATENT DOCUMENTS

| | | | | |
|---|---|---|---|---|
| 2021/0311866 | A1* | 10/2021 | Simon ................ | G06F 11/3664 |
| 2023/0376408 | A1* | 11/2023 | Wan ................... | G06F 11/3688 |

OTHER PUBLICATIONS

Karlsson, Stefan, Adnan Čaušević, and Daniel Sundmark. "QuickREST: Property-based test generation of OpenAPI-described RESTful APIs." 2020 IEEE 13th International Conference on Software Testing, Validation and Verification (ICST). IEEE, 2020. (Year: 2020).*
Legunsen, Owolabi, et al. "How good are the specs? A study of the bug-finding effectiveness of existing Java API specifications." Proceedings of the 31st IEEE/ACM International Conference on Automated Software Engineering. 2016. (Year: 2016).*
Ed-Douibi, Hamza, Javier Luis Canovas Izquierdo, and Jordi Cabot. "Automatic generation of test cases for REST APIs: A specification-based approach." 2018 IEEE 22nd international enterprise distributed object computing conference (EDOC). IEEE, 2018. (Year: 2018).*
Martin-Lopez, Alberto, Sergio Segura, and Antonio Ruiz-Cortés. "RESTest: Black-box constraint-based testing of RESTful web APIs." International Conference on Service-Oriented Computing. Cham: Springer International Publishing, 2020. (Year: 2020).*
Karen Scarfone et al., "Technical Guide to Information Security Testing and Assessment," Recommendations of the National Institute of Standards and Technology, NIST Special Publication No. 800-115, National Institute of Standards and Technology, Sep. 2008, 80 pgs.
Eoin Keary. OWASP Board Member Forward Author, "Testing Guide 4.0," Open Web Application Security Project, Apr. 19, 2013, 224 pgs.
International Search Report and Written Opinion corresponding to PCT/US2022/073072, dated Oct. 12, 2022, 13 pages.
Ali Shokri et al.: "ArCode: A Tool for Supporting Comprehension and Implementation of Architectural Concerns", arxiv.org, Cornell University Library, 201 Olin Library Cornell University, Ithaca, NY 14853, XP081909752, Chapter II, Mar. 11, 2021, 6 pages.
Bohme M., et al., "Coverage-based Greybox Fuzzing as Markov Chain", Transactions on Software Engineering, Jul. 2017, pp. 1-18.
Cadar C., et al., "KLEE: Unassisted and Automatic Generation of High-Coverage Tests for Complex Systems Programs", 8th USENIX Symposium on Operating Systems Design and Implementation, Jan. 2008, pp. 209-224.
Office Action for European Application No. 22744625.9, dated Aug. 18, 2025, 30 Pages.
Shoshitaishvili Y., et al., "Mechanical Phish: Resilient Autonomous Hacking", IEEE Security Privacy, Mar./Apr. 2018, pp. 12-22.
Sohval B., et al., "A Deep Dive in Scoring Methodology", Security Scorecard. com, 2020, 34 Pages.
Viglianisi E., et al., "RESTTESTGEN: Automated Black-Box Testing of RESTful APIs", 2020 IEEE 13th International Conference on Software Testing, Validation and Verification (ICST), Oct. 2020, 11 Pages.
Weyuker E.J., "On Testing Non-testable Programs", The Computer Journal, vol. 25, No. 4, 1982, pp. 465-470.

* cited by examiner

200 ⟶

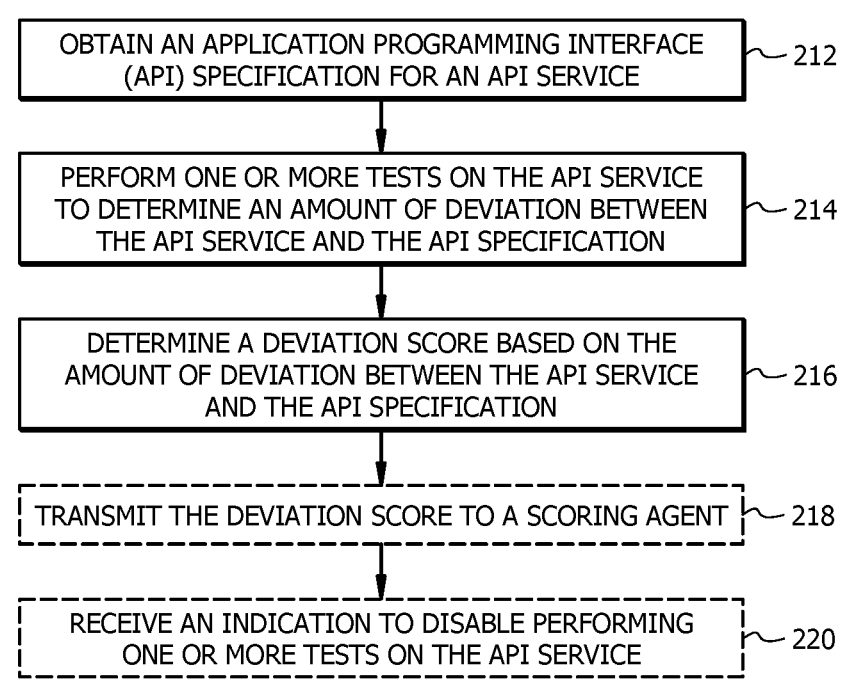

OBTAIN AN APPLICATION PROGRAMMING INTERFACE (API) SPECIFICATION FOR AN API SERVICE ⟞ 212

PERFORM ONE OR MORE TESTS ON THE API SERVICE TO DETERMINE AN AMOUNT OF DEVIATION BETWEEN THE API SERVICE AND THE API SPECIFICATION ⟞ 214

DETERMINE A DEVIATION SCORE BASED ON THE AMOUNT OF DEVIATION BETWEEN THE API SERVICE AND THE API SPECIFICATION ⟞ 216

TRANSMIT THE DEVIATION SCORE TO A SCORING AGENT ⟞ 218

RECEIVE AN INDICATION TO DISABLE PERFORMING ONE OR MORE TESTS ON THE API SERVICE ⟞ 220

*FIG. 2*

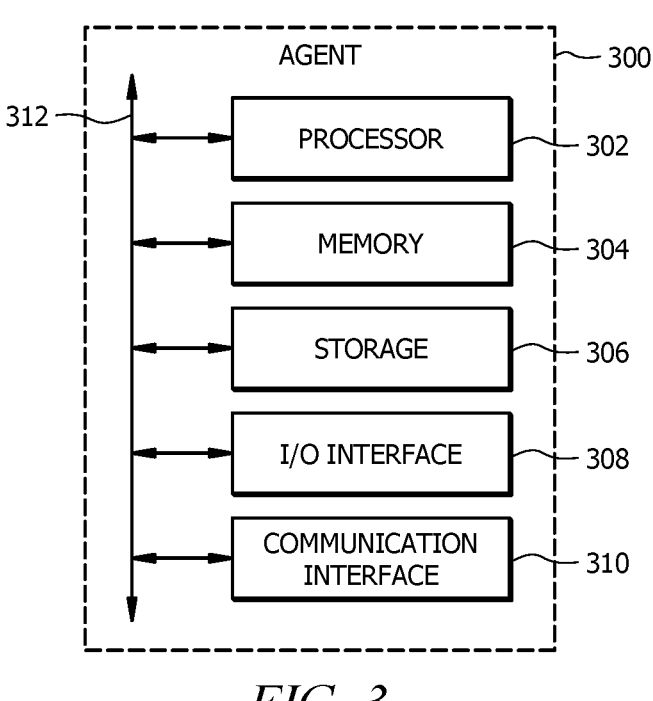

AGENT ⟞ 300

312 ⟶

PROCESSOR ⟞ 302

MEMORY ⟞ 304

STORAGE ⟞ 306

I/O INTERFACE ⟞ 308

COMMUNICATION INTERFACE ⟞ 310

*FIG. 3*

PENETRATION TESTING FOR API SERVICE SECURITY

RELATED APPLICATIONS

This application claims priority to U.S. Provisional Application Ser. No. 63/217,055 entitled "Penetration Testing for API Service Security," filed Jun. 30, 2021, the entire content of which is incorporated herein by reference.

TECHNICAL FIELD

This disclosure generally relates to application security, and more specifically to application programming interface (API) security.

BACKGROUND

When an enterprise application uses APIs from internal or third party services, the users of that application are exposed to certain security risks. These risks include data leakage of personally identifiable information, penetration or hacking of the calling party or application, and/or other nefarious use.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 is a flow diagram illustrating an example method performed by a security agent, according to particular embodiments; and FIG. 3 is a block diagram illustrating an example security agent, according to particular embodiments.

DESCRIPTION OF EXAMPLE EMBODIMENTS

Overview

Figure 1:
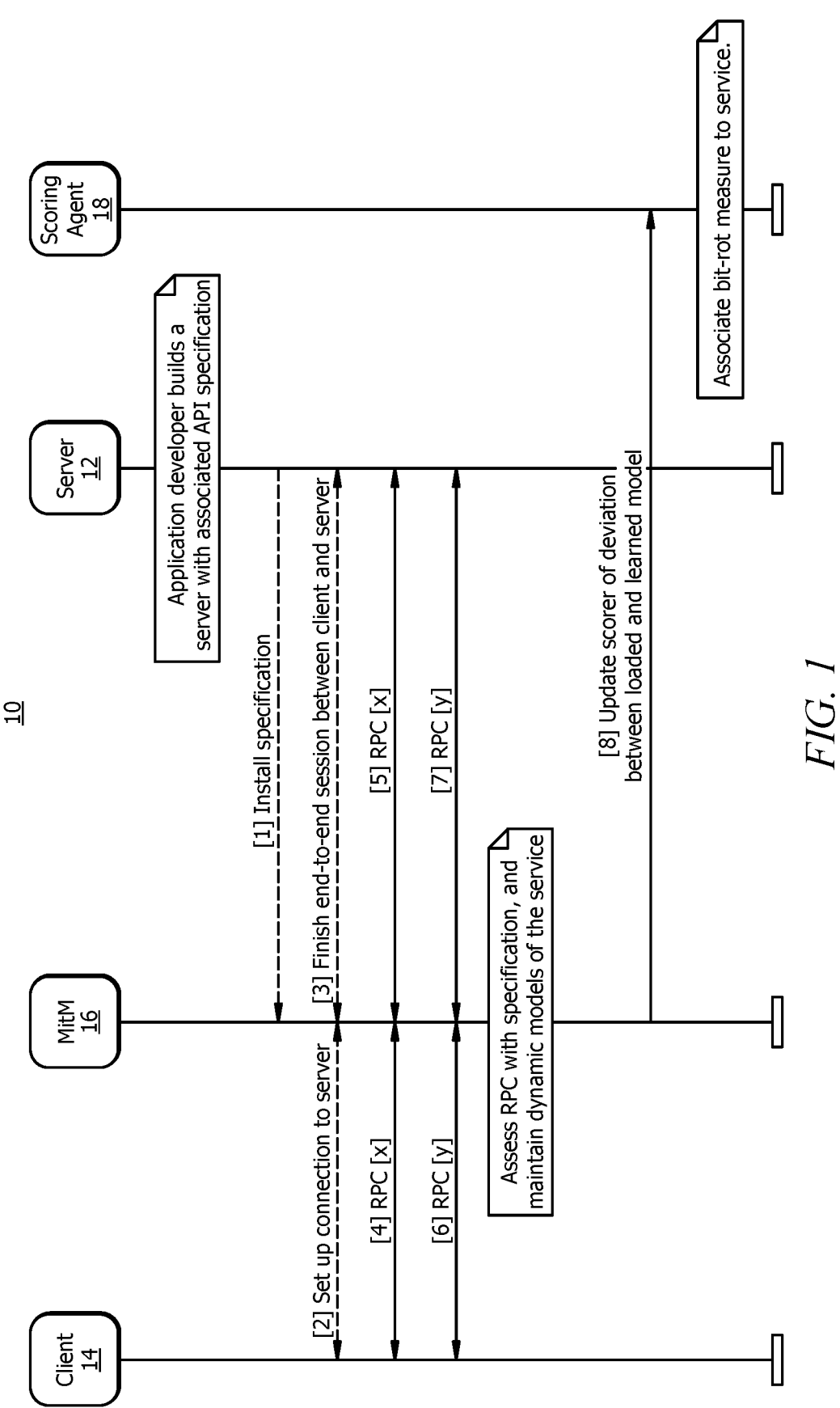
FIG. 1 is a flow diagram illustrating API analysis, according to particular embodiments.

When application programing interface (API) services are used in an application, the calling application is exposed to any vulnerabilities of the API services. Data can leak, the server can (inadvertently) attack the calling application and expose the calling application to malware, adware, cross-site scripting or otherwise, or the service simply does not implement what the service says its implements by way of its interface definition language (IDL) specification, documentation or other sources.

Moreover, discrepancies may exist between a published IDL and the actual API server implementation. If a client application can be made aware of the level of deficiency in real time, the client application can define and/or enforce security and application vulnerability policies (e.g., allow, amend or even deny access to a service) based on the number of deficiencies.

One method to test a service is to apply a sequence of penetration tests on the API service. A set of positive and negative tests may be run against a service and based on the responses from the API service, the calling party may associate a security score to the tests. The service should be able to withstand all such tests, possibly even under duress, but more likely than not, most API services will expose issues with the service.

Another problem is that such tests can be circumvented by the API service itself. For example, some software may recognize it is being tested and react perfectly to the tester. The same applies for API services. In such cases, the software under test may return test data, thereby making it difficult for the tester to understand if the service is well implemented.

Particular embodiments include testing and recognizing "bit-rot," the phenomenon that software quality (and thus API services) deteriorate over time. The measure may be used in enforcing security policies.

According to some embodiments, a method comprises: obtaining an application programming interface (API) specification for an API service; performing one or more tests on the API service to determine an amount of deviation between the API service and the API specification; and determining a deviation score based on the amount of deviation between the API service and the API specification. The method may include transmitting the deviation score to a scoring agent.

Discrepancies may exist between a published IDL and the API implementation. If a client application is made aware of the level of deficiency in real time, the client application may define and/or enforce policies (e.g., allow, amend or even deny access to a service) based on the amount or number of deficiencies. Penetration testing may be used to detect discrepancies. The penetration testing may be co-mingled with normal operation to disguise the testing.

Example Embodiments

Application developers may use external services through application programming interfaces (APIs) when implementing their enterprise applications. By using external API services in applications, a developer may leverage available technology and significantly speed up the development cycle. However, the use of external API services exposes applications to problems with the APIs. For example, among other problems, services often do not fully or completely implement the specification as defined by the interface definition language (IDL) describing the API.

Penetration testing can be used to identify such implementation omissions. Penetration testing involves invoking each interface of the API service, sometimes multiple times with different parameters or even with fuzzed parameters and verifying the results. In this way, the penetration test can detect unimplemented or incorrectly implemented interfaces.

Another way to identify API implementation omissions is to dynamically reconstruct the IDL specification and compare it with the published IDL specification for a service to identify discrepancies. For this, a client-side application is used to first capture the requests that are sent to the server, by a transparent agent (or man-in-the-middle) for example, and then to capture the responses. By collecting a large set of requests and responses, the client-side application may recreate the likely IDL specification.

Thus, as the client applications are using the services, the collected telemetry forms the basis for the IDL definition. If the recreation is performed across a large body of client applications, the specificity of the interface definition improves as more methods are used and more fidelity of the data fields is learned. Moreover, by tracking multiple of such calls, parameter dependencies are found.

Based on the results of the penetration testing and/or the IDL reconstruction, the API service may be assigned a score. API services with fewer discrepancies with the published IDL may receive a higher score than those with more discrepancies. Client applications may use the score to define and/or enforce policies (e.g., allow, amend or even deny access to a service).

Over time, discrepancies between what the server implements and what is defined through the IDL may change. For example, changes to API server software, hardware, or third party services used by the application may change (e.g., software/hardware upgrades, availability of libraries, etc.). These changes may then affect the API service. Although some upgrades may fix prior problems, the trend over time may be an increase in the discrepancies. This may be referred to as API service degradation or "bit rot." Alternatively, a service may become better as well, showing the inverse.

Thus, one advantage of particular embodiments is to dynamically update the score over time so that the score reflects the current state of the API service. An example implementation is illustrated in FIG. 1.

FIG. 1 is a flow diagram illustrating API analysis. The illustrated example system 10 includes server 12 to be tested, client 14 to test server 12, man-in-the-middle (MitM) application 16 to perform API analysis, and scoring agent 18 for storing scores.

Initially, an application developer builds a server with an associated API specification. At step 1, MitM application 16 receives the API specification from server 12. For example, MitM application 16 may receive one or more IDL files from server 12. In other embodiments, MitM application 16 may receive the API specification from another source. For example, an application provider may manually upload one or more IDL files to MitM application 16.

MitM application 16 is configured to act as a proxy between client 14 and server 12. MitM application 16 receives, inspects, and analyzes the requests and responses between client 14 and server 12. At step 2, client 14 sets up a connection to server 12 via MitM application 16. At step 3, MitM application 16 completes the end-to-end session setup between the client 14 and server 12.

At steps 4-7, client 14 makes a series of remote procedure calls (RPCs) to the server 12 via MitM application 16. The RPCs may be designed to test all or part of the Server API. The vast majority of the RPCs executed from client 14 to server 12 may be legitimate RPCs and are part of the workload. To ensure that the API service cannot cheat the testing regime, particular embodiments randomly insert a set of a positive and negative API service tests to ensure the API service is still working appropriately. Thus, the series of RPCs may include a penetration test intermixed with regular operations.

The series of RPCs may be designed to dynamically construct an IDL for the API and moreover to build an outside view of the server. The system may use machine learning and/or artificial intelligence learning techniques. MitM application 16 uses the information to assess the RPCs with the published specification and may maintain a dynamic model of the Server API that reflects the "actual" IDL.

Methods to include discrepancies include assessing over time responses and return values to: purposefully omitting required parameters, fuzzing input parameters, observing deviating responses on similar requests over time, purposefully submitting flawed requests, submitting invalid API service tokens, assessing the performance of requests (slower, faster), purposefully changing parameters mid-stream in a sequence of requests, purposefully mishandling API service tokens and authorizations to get access to un-authorized data, purposefully creating and posting invalid data to the service and more.

Discrepancies are detected by keeping a log of the responses and keeping a measure for the deficiency rates of the service. If more deficiencies are found over time, it is experiencing bit-rot and the score should reflect this. On the other hand, if the service improves, this should be positively reflected in the security score.

In some embodiments, client 14 is not a test client, but a live enterprise application, for example. MitM application 16 may analyze the API based on the RPCs called during normal operation. MitM application 16 may base its analysis on RPCs made by more than one client application. This is a form of chaos engineering where the chaos engineering is integrated with penetration test services. It is referred to chaos engineering because some of the tests may actually be destructive on the service. In some embodiments, there is an option to disable this feature when the API service owner does not appreciate such testing. In such cases, the score of the service can reflect the unwillingness for external penetration testing.

Using the MitM approach benefits the model learning phase. The model can then capture the actual use of the service and also gets a sense for the most commonly used parameters. For example, if in 99.9% of the cases a particular method in a service receives a parameter between 0-9, if a client sends a very large number, it is likely flawed. The penetration testing functionality can use the server's response to such interesting parameter values to further train its penetration testing system.

After determining any deviation between the published IDL and the Server API, at step 8 MitM application 16 updates scoring agent 18 based on the determined deviation. Scoring agent 18 may use the determined deviation, either alone or in combination with other metrics, to assign a score to server 12.

Other clients may access scoring agent 18 to retrieve the score for server 12. The clients may define and/or apply policies based on the score for server 12.

Some embodiments may not include MitM application 16 and client 14 may perform the analysis. Similarly, some embodiments may not include scoring agent 18 and the score for server 12 may be stored with server 12 or client 14. In general, the scoring and analysis may be performed by a security agent, and the security agent reside at any one or more of MitM application 16, client 14, server 12, and/or scoring agent 18.

In some embodiments, penetration tests are included in the application using the API service in a manner such that the testing is disguised to the API service. Assume there is an application that uses service A continuously. Intermingling a series of test cases into regular operations (e.g., 1% of the requests are test requests, the remainder are normal operations) makes it difficult for the tested service to understand it is being tested, while providing the caller good insight into the quality of the service. Moreover, combining such testing across a set of calling applications and coordinating between the callers, it is almost impossible for the API service to deduce it is being tested.

The downside of testing "in-line" is that it minimally slows down the calling application. Given that such tests may be destructive for poor service implementations, not all callers may want to participate. The performance impact is low, but more importantly, while there is a risk the tests are destructive, such tests reveal serious problems with the API service and addressing such problems provides for better results longer term. In a sense, this type of testing is chaos engineering applied to API security.

FIG. 2 is a flow diagram illustrating a method performed by a security agent, according to some embodiments. The steps of method 200 in FIG. 2 may be performed by agent 300 described with respect to FIG. 3.

The method begins at step 212, where the security agent obtains an application programming interface (API) specification for an API service. For example, to be able to analyze the API service, the security agent needs to know the API specification that the API service purports to implement. The API specification may be obtained in various ways.

In some embodiments, the security agent may obtain one or more files containing interface definition language (IDL) specifications for the API service. The security agent may receive the files from the API service, the files may be uploaded to the security agent, or the files may be obtained from any other suitable location (e.g., standard repository, etc.).

In some embodiments, the security agent may dynamically construct an IDL specification for the API service based on remote procedure calls (RPCs) with the API service. The security agent may implement RPCs designed by the security agent as test RPCs to generate the IDL. The security agent may proxy one or more requests and responses between one or more client applications and the API service. By observing these requests and responses over time, the security agent may generate the IDL.

At step 214, the security agent performs one or more tests on the API service to determine an amount of deviation between the API service and the API specification. For example, now that the security agent knows the API specification, the security agent run penetration tests designed to test the parameter of the API service. In some embodiments, the security agent may proxy one or more requests and responses between one or more client applications and the API service. By observing these requests and responses over time, the security agent may determine how well the API service adheres to the API specification.

At step 216, the security agent determines a deviation score based on the amount of deviation between the API service and the API specification. Examples of determining a deviation are described above and may include assessing over time responses and return values to: purposefully omitting required parameters, fuzzing input parameters, observing deviating responses on similar requests over time, purposefully submitting flawed requests, submitting invalid API service tokens, assessing the performance of requests (slower, faster), purposefully changing parameters midstream in a sequence of requests, purposefully mishandling API service tokens and authorizations to get access to un-authorized data, purposefully creating and posting invalid data to the service and more.

At step 218, the security agent may transmit the deviation score to a scoring agent. The scoring agent may then store the deviation score or combine the deviation score with other scores for the API service to arrive at a combined security score for the API service. Other clients may access the scoring agent to retrieve a deviation score or combined security score for the API service and make policy decisions based on the results.

As described above, in some embodiments the security agent may be included or embedded as part of the client application (e.g., to mask testing activity). In some conditions, performing the testing may be undesirable.

At step 220, the security agent receives an indication to disable performing one or more tests on the API service. When the testing is disabled, the deviation score may be updated to reflect the condition.

Modifications, additions, or omissions may be made to method 200 depicted in FIG. 2. Method 200 may include more, fewer, or other steps. Additionally, steps may be performed in parallel or in any suitable order. Method 200 may be repeated as necessary and the deviation score may be updated to reflect any changes over time.

FIG. 3 is a block diagram illustrating an example security agent, according to particular embodiments. In particular embodiments, one or more agents 300 perform one or more steps of one or more methods described or illustrated herein. In particular embodiments, one or more agents 300 provide functionality described or illustrated herein, such as the functionality described with respect to FIGS. 1 and 2 (e.g., functionality with respect to server 12, client 14, and/or MitM application 16). In particular embodiments, software running on one or more agents 300 performs one or more steps of one or more methods described or illustrated herein or provides functionality described or illustrated herein. Particular embodiments include one or more portions of one or more agents 300. Herein, reference to an agent may encompass a computing device, and vice versa, where appropriate. Moreover, reference to an agent may encompass one or more agents, where appropriate.

Particular embodiments may include any suitable number of agents 300. Agent 300 may take any suitable physical form. As example and not by way of limitation, agent 300 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a server, or a combination of two or more of these. Where appropriate, agent 300 may include one or more agents 300; be unitary or distributed; span multiple locations; span multiple machines; span multiple data centers; or reside in a cloud, which may include one or more cloud components in one or more networks.

Where appropriate, one or more agents 300 may perform without substantial spatial or temporal limitation one or more steps of one or more methods described or illustrated herein. As an example and not by way of limitation, one or more agents 300 may perform in real time or in batch mode one or more steps of one or more methods described or illustrated herein. One or more agents 300 may perform at different times or at different locations one or more steps of one or more methods described or illustrated herein, where appropriate.

In particular embodiments, agent 300 includes a processor 302, memory 304, storage 306, an input/output (I/O) interface 308, a communication interface 310, and a bus 312. Although this disclosure describes and illustrates a particular agent having a particular number of particular components in a particular arrangement, particular embodiments may include any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. Processor 302 may include any suitable number of any suitable internal caches, where appropriate.

As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302.

In particular embodiments, processor 302 may include one or more internal registers for data, instructions, or addresses. Processor 302 may include any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, particular embodiments may include any suitable processor.

In particular embodiments, memory 304 includes main memory for storing instructions for processor 302 to execute or data for processor 302 to operate on. As an example and not by way of limitation, agent 300 may load instructions from storage 306 or another source (such as, for example, another computer system 700) to memory 304. Processor 302 may then load the instructions from memory 304 to an internal register or internal cache.

To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or else-where) and operates only on data in one or more internal registers or internal caches or in memory 304 (as opposed to storage 306 or elsewhere).

One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 304 may include one or more memories 304, where appropriate. Although this disclosure describes and illustrates particular memory, particular embodiments may include any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to agent 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 306 may take any suitable physical form. Storage 306 may include one or more storage control units facilitating communication between processor 302 and storage 306, where appropriate. Where appropriate, storage 306 may include one or more storages 306. Although this disclosure describes and illustrates particular storage, particular embodiments may include any suitable storage.

In particular embodiments, I/O interface 308 includes hardware, software, or both, providing one or more interfaces for communication between agent 300 and one or more I/O devices. Agent 300 may include one or more of these I/O devices, where ap-propriate. One or more of these I/O devices may enable communication between a person and agent 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, particular embodiments may include any suitable I/O interface. In particular embodiments, I/O interface 308 may include an interface to a remote network management system.

In particular embodiments, communication interface 310 includes hardware, software, or both providing one or more interfaces for communication (such as, for example, packet-based communication) between agent 300 and one or more other agents 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 310 for it. As an example and not by way of limitation, agent 300 may communicate with an ad hoc network, a personal area network (PAN), a LAN, WAN, MAN, or one or more portions of the Internet or a combination of two or more of these. One or more portions of one or more of these networks may be wired or wireless. As an example, agent 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Agent 300 may include any suitable communication interface 310 for any of these networks, where appropriate. Communication interface 310 may include one or more communication interfaces 310, where appropriate. Although this disclosure describes and illustrates a particular communication interface, particular embodiments may include any suitable communication interface.

In particular embodiments, bus 312 includes hardware, software, or both coupling com-ponents of agent 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate The following is a more detailed description of security scoring for API endpoints. As described above, when applications use third-party API endpoints, such applications may expose critical information to third-party service providers. By providing a security score for the third-party service providers, such interactions may be prevented should the security score be suboptimal or just plainly poor. Security scores may be provided at the infrastructure level and at the application level.

How to calculate a reputation score for an organization is described in "A Deep Dive in Scoring Methodology", B. Sohval, SecurityScorecard.com, 2020. The reputation score is defined as the likelihood of a data breach in such an organization and is calculated by (a) assessing prior data-breaches into (all) organizations and deciding the contributing factors that led to the breach, (b) analyzing which contributing factors can be observed from the outside-in, (c) building an infrastructure that observes all Internet-facing organizations for such observable events, and then finally (d) given the incidence of breaches, provide the score given the contributing weights of each of the sensed events.

Because data breaches change with changing software infrastructure, the events that need to be observed change as well and the individual contribution of each of the sensed events changes. If the observed events are modeled as a vector, then the vector changes over time and the weights of each of the elements in the vector is dynamic. As per Sohval, SecurityScorecard today uses a vector that focusses on network security, domain name system (DNS) health, patching cadence, endpoint security, IP reputation, application security, proprietary information, hacker chatter, information leaks and social engineering—all elements that do not require access to the actual application.

Sohval, SecurityScorecard and their competitors are not in the business of scoring endpoints of services, also referred to as API endpoints. As per "API security: What You Need to Do to Protect Your APIs", Zumerle et al., Gartner, August 2019, API security is a new attack surface for nefarious actors, and often, misuse of APIs can lead to data breaches. API security is not covered by Sohval, SecurityScorecard and their competitors today for a few simple reasons:

Incidence reports of API security-based data breaches are not readily available, making scoring a challenge. Additionally, API security-based breaches are mostly based on misuse of the application logic, less so on the infrastructure of setting up services on the Internet. This makes automated "outside-in" gathering of events a challenge and less scalable.

The Open Web Application Security Project (OWASP) publishes top-10 lists of common mistakes made for client and server applications generally for API endpoints specifically. Indeed, many of these issues are application specific and not easily sensed by SecurityScorecard and competitors by simply observing interactions on the network, or by simply setting up a HTTP(s) session with a remote service: it requires intelligent interactions to understand if an API endpoint can be misused. The top-10 issues for API misuse include broken authentication (object, user, function), security misconfigurations, data misuse (excessive data exposure, mass assignment, injection), visibility (assets, logging, monitoring) and resource management.

To provide for an API security score, particular embodiments described herein include a method to gather information about APIs. Whereas Sohval and others simply observe communication, attract traffic with honeypots and sinkholes, and gather other telemetry with sensors operating in the Internet, particular embodiments deploy API endpoint testing agents in the applications. The API testing agents interact with the API endpoint and attempt to misuse it. After breaking an API endpoint, particular embodiments know its deficiencies and may score the API endpoint relative to other API endpoints.

To break an API endpoint, first, an agent may build a model of the API endpoint (e.g., how do applications typically use the API endpoint?), and with the model, the teachings of OWASP API top 10 and API definition available, the agent automatically crafts a set of tests to test the API endpoint. Techniques that may be used for this are included in "KLEE: Unassisted and Automatic Generation of High-Coverage Tests for Complex Systems Programs", Cadar et al., OSDI'08 and "Mechanical Phish: Resilient Autonomous Hacking", Shoshitaishvili et al., IEEE Computer and Reliability Societies, IEEE to find issues with the infrastructure of the application, such as: badly formed transport layer security (TLS) certificates, common vulnerabilities and exposures (CVE) issues, cross-site scripting and more. To get insight into the actual behavior of the API endpoint, an agent may rely on the teachings of "On Testing Non-testable Programs", Weyuker, 1982, The Computer Journal, Vol 24, No. 4, Wiley Heyden. Weyuker argues one needs to understand the output of test cases at a semantic, i.e., application, level before results can be accepted. Based on this, "Automatic Generation of Test Cases for REST APIs: A Specification-Based Approach", H. Ed-douibi et al., 2018 IEEE 22$^{nd}$ IEDOCC, IEEE Computer Society, 2018 and "RestTestGen: Automated Black-Box Testing of REST-ful APIs", E. Viglianisi et al., 2020 IEEE 13$^{th}$ ICST, IEEE Computer Society present methods how to transform swag-ger/OpenAPI Interface Definition Language (IDL) specifi-cation into a set of test cases that lead to negative and positive results at the application level. Both authors found implementation issues with publicly available APIs through API guru.

Some embodiments may extend applications that use a particular API endpoint with code to record the interactions to learn "normal" behavior, combine this with such interac-tions from other clients, aggregate all those interactions and combine this with test cases generated with techniques described by Ed-douibi and Viglianisi to obtain a model of how a particular API endpoint is used in a normal setting to form the semantic (meta-) model. The recordings may occur in both the application's stage- or run-time phase. The semantic modeling may be continuous as API endpoints change over time.

For each of the categories in the OWASP API top 10, and positive/negative tests with the semantic (meta-) model and the typical use of the API endpoint, some embodiments derive tests that should succeed/fail on the API endpoint. With these tests, an agent may exercise the API endpoint. The test cases may be a separate stage before applications using the API endpoint are deployed or may be used while the application is actually operating. Some care should be taken not to significantly disrupt the application, but it is an effective method to continuously test API endpoints. This method comprises chaos testing using API endpoints for actual (potentially disruptive) testing. With these tests, an agent may formulate an API endpoint security score that is in line with the number of discrepancies between the expected test results and the actual test results (practically, some embodiments may count the number of successful HTTP operations—2xx—versus 4xx and 5xx responses).

Semantic API endpoint tests may be performed with or without assistance of the provider of the API endpoint. There are three important reasons why the service provider may wish to participate. First, it is in the interest of the provider to show that it provides for a well implemented API end-point. The provider can advertise this and attract more revenue for its services if it can show that it can withstand intrusion attempts. Second, the client of the service may demand such testing before it will use the API endpoint. Lastly, when the service provider is exposed to the semantic model of their application, they can train their ingress web-application firewall to the learnt model and flag all those calls that deviate from it to trap anomalous or nefari-ous behavior. Even today, a consuming party engages, mostly manually, with third-party providers to make sure it is not exposing itself to external vulnerabilities. By auto-mating this, API endpoints are more consumable, and all parties are more assured of a proper interaction.

There are cases where the provider of a service does not wish to participate in the testing of its API endpoint, or the provider is simply disinterested in participating. Yet, if a consumer of an API endpoint uses the API endpoint for their services, there is little an API endpoint provider can do to avoid this Black-Box testing.

There are also cases where the provider of a service wishes to participate to the point that they can even enable service testing. This testing then degenerates into Grey-Box fuzzing (see "Coverage-based Greybox Fuzzing as Markov Chain", M. Bohme et al., Transaction of Software Engineer-ing, July 2017) or even White-Box testing. In these cases, more detailed and more precise test coverage can be real-ized, and a more precise semantic-level score can be pro-vided.

With all testing in hand, both at the infrastructure of the application and at the semantic level, two variables may describe the current security state of an API endpoint: the infrastructure application score and the semantic score. These scores may be used by the applications, their devel-opers, chief information security officers, or security per-sonnel to allow or deny calls by policy. Such policies can take into consideration the classification of the data carried and the scores associated with the API endpoints. Agents can be introduced in the calling application that only enable such calls to go through when the combined security score is in alignment with security policies set by the enterprise hosting the application. Because security scores vary over time, application behavior may be affected over time as well.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permu-tation of any of the components, elements, features, func-tions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

The invention claimed is:

1. A system, comprising:
   one or more processors; and
   one or more computer-readable non-transitory storage media comprising instructions that, when executed by the one or more processors, cause one or more com-ponents of the system to perform operations compris-ing:
      obtaining an application programming interface (API) specification for an API service;
      testing security of the API service by intermixing one or more penetration tests with a series of remote procedure calls (RPCs) called during normal opera-tion to detect discrepancies between the API service and the API specification;

determining, in response to testing the API service, an amount of deviation between the API service and the API specification; and determining a deviation score based on the amount of deviation between the API service and the API specification.

2. The system of claim 1, the operations further comprising transmitting the deviation score to a scoring agent.

3. The system of claim 1, wherein obtaining the API specification comprises obtaining one or more files containing interface definition language (IDL) specifications for the API service.

4. The system of claim 3, wherein the one or more files containing IDL specifications are obtained from the API service.

5. The system of claim 1, wherein obtaining the API specification comprises dynamically constructing an interface definition language (IDL) specification for the API service based on RPCs with the API service.

6. The system of claim 5, wherein dynamically constructing the IDL specification comprises proxying one or more requests and responses between one or more client applications and the API service.

7. The system of claim 1, wherein the one or more penetration tests include:

submitting invalid API service tokens; and purposefully mishandling API service tokens and authorizations in an attempt to gain access to un-authorized data.

8. The system of claim 1, wherein testing the API service comprises proxying one or more requests and responses between one or more client applications and the API service.

9. The system of claim 1, the operations further comprising receiving an indication to disable performing one or more tests on the API service.

10. The system of claim 9, wherein determining the deviation score is further based on the indication to disable performing one or more tests on the API service.

11. A method comprising:

obtaining an application programming interface (API) specification for an API service;

testing security of the API service by intermixing one or more penetration tests with a series of remote procedure calls (RPCs) called during normal operation to detect discrepancies between the API service and the API specification;

determining, in response to testing the API service, an amount of deviation between the API service and the API specification; and determining a deviation score based on the amount of deviation between the API service and the API specification.

12. The method of claim 11, further comprising transmitting the deviation score to a scoring agent.

13. The method of claim 11, wherein obtaining the API specification comprises obtaining one or more files containing interface definition language (IDL) specifications for the API service.

14. The method of claim 13, wherein the one or more files containing IDL specifications are obtained from the API service.

15. The method of claim 11, wherein obtaining the API specification comprises dynamically constructing an interface definition language (IDL) specification for the API service based on RPCs with the API service.

16. The method of claim 15, wherein dynamically constructing the IDL specification comprises proxying one or more requests and responses between one or more client applications and the API service.

17. The method of claim 11, wherein the one or more penetration tests include:

submitting invalid API service tokens; and purposefully mishandling API service tokens and authorizations in an attempt to gain access to un-authorized data.

18. The method of claim 11, wherein testing the API service comprises proxying one or more requests and responses between one or more client applications and the API service.

19. The method of claim 11, further comprising receiving an indication to disable performing one or more tests on the API service.

20. The method of claim 19, wherein determining the deviation score is further based on the indication to disable performing one or more tests on the API service.

* * * * *